United States Patent
Li et al.

(10) Patent No.: US 8,961,034 B2
(45) Date of Patent: Feb. 24, 2015

(54) OPTICAL FIBER CONNECTOR FERRULE HAVING OPEN FIBER CLAMPING GROOVES

(75) Inventors: Shuhe Li, Pasadena, CA (US); Robert Ryan Vallance, Newbury Park, CA (US); Michael K. Barnoski, Pacific Palisades, CA (US)

(73) Assignee: Nanoprecision Products, Inc., El Segundo, CA (US)

( * ) Notice: Subject to any disclaimer, the term of this patent is extended or adjusted under 35 U.S.C. 154(b) by 119 days.

(21) Appl. No.: 13/440,970

(22) Filed: Apr. 5, 2012

(65) Prior Publication Data

US 2012/0257860 A1   Oct. 11, 2012

Related U.S. Application Data

(60) Provisional application No. 61/472,133, filed on Apr. 5, 2011.

(51) Int. Cl.
    *G02B 6/36* (2006.01)
    *G02B 6/38* (2006.01)

(52) U.S. Cl.
    CPC ............ *G02B 6/3839* (2013.01); *G02B 6/3885* (2013.01); *G02B 6/3858* (2013.01); *G02B 6/364* (2013.01)
    USPC .................................. 385/65; 385/83; 385/137

(58) Field of Classification Search
    None
    See application file for complete search history.

(56) References Cited

U.S. PATENT DOCUMENTS

| | | | |
|---|---|---|---|
| 4,830,456 A * | 5/1989 | Kakii et al. ...................... 385/75 |
| 5,359,687 A * | 10/1994 | McFarland et al. .............. 385/49 |
| 5,664,039 A * | 9/1997 | Grinderslev et al. ........... 385/65 |
| 6,321,020 B1 | 11/2001 | Fukuyama et al. |
| 6,810,195 B2 * | 10/2004 | Bhagavatula et al. ......... 385/137 |
| 6,817,777 B1 * | 11/2004 | Grabbe ........................... 385/59 |
| 2001/0036341 A1 | 11/2001 | Ohtsuka et al. |
| 2003/0175000 A1 * | 9/2003 | Caracci et al. ................. 385/137 |
| 2006/0188211 A1 | 8/2006 | Iwase et al. |

FOREIGN PATENT DOCUMENTS

| | | |
|---|---|---|
| DE | 2627042 | 12/1977 |
| JP | 56-85718 | 7/1981 |
| JP | 63-249116 | 10/1988 |

(Continued)

OTHER PUBLICATIONS

International Search Report of Counterpart PCT International Application No. PCT/US2012/032440.

*Primary Examiner* — Mike Stahl
(74) *Attorney, Agent, or Firm* — Liu & Liu

(57) ABSTRACT

A ferrule for an optical fiber connector having open fiber clamping grooves. The ferrule has a body having a plurality of open grooves for clamping the terminating end sections of optical fibers. At least a section of the longitudinal opening of the groove is provided with opposing lips to provide a clamping effect. The width of the longitudinal opening defined between the lips along at least a section of the grooves is narrower than the diameter of the optical fibers to create a tight fit. The grooves and the width of the longitudinal groove openings are shaped and sized to retain the fibers without any clearance to allow for movement of the fiber relative to the groove. Similar grooves may be provided in the ferrule body for alignment guide pins. The grooves are precision formed by high throughput processes, such as stamping and extrusion.

22 Claims, 9 Drawing Sheets

(56) References Cited

FOREIGN PATENT DOCUMENTS

| JP | 9-203824 | 8/1997 |
| JP | 11-109161 | 4/1999 |
| WO | 2004/086111 | 10/2004 |
| WO | 2005/114284 | 12/2005 |

* cited by examiner

OPTICAL FIBER CONNECTOR FERRULE HAVING OPEN FIBER CLAMPING GROOVES

PRIORITY CLAIM

This application claims the priority of U.S. Provisional Patent Application No. 61/472,133 filed on Apr. 5, 2011, which is fully incorporated by reference as if fully set forth herein. All publications noted below are fully incorporated by reference as if fully set forth herein.

BACKGROUND OF THE INVENTION

1. Field of the Invention

The present invention relates to optical fiber connectors, in particular ferrules in optical fiber connectors.

2. Description of Related Art

There are many advantages of transmitting light signal via optical fiber waveguides and the use thereof is diverse. Single or multiple fiber waveguides may be used simply for transmitting visible light to a remote location. Complex telephony and data communication systems may transmit multiple specific optical signals. These devices couple fibers in an end-to-end relationship, with the coupling being one source of light loss. Precision alignment of two polished ends of fibers is needed to ensure that overall optical loss in a fiber link is equal or less than the specified optical connector loss budget for a system. For single-mode telecommunication-grade fiber, this typically corresponds to connector fiber alignment tolerances that are less than 1000 nm. This means that in both parallel fiber and single fiber links, operating at multi-gigabit rates, the components applied to align the fibers must be assembled and fabricated with sub-micron precision.

In an optical fiber connection, an optical fiber connector terminates the end of a cable that contains one or multiple fibers, and enables quicker connection and disconnection than splicing. The connectors mechanically couple and align the cores of fibers so that light can pass end-to-end. Better connectors lose very little light due to reflection or misalignment of the fibers. Connectors, in both parallel/multiple fiber and single fiber links, operating at multi-gigabit rates must be assembled with subcomponents fabricated with sub micron precision. As if producing parts with such precision levels were not challenging enough, for the resulting end product to be economical it must be done in a fully automated, very high-speed process.

Current optical fiber connectors have not changed in basic design for many years. The basic connector unit is a connector assembly. FIG. 8 illustrates an example of an optical fiber connector 100 for a cable 110 containing optical fibers 112, which is commercialized by US Conec Ltd. The connector includes an assembly of components consisting of a ferrule 102, a ferrule housing 104, a cable jacket or boot 106, alignment guide pins 108, and other hardware provided within or outside the housing (e.g., cable strain relief, crimp, biasing spring, spacer, etc.). The ferrule 102 and the terminating end faces of the fibers 112 are polished. The ferrule 108 in the optical fiber connector 100 is spring-loaded to provide an axial bias to press together the polished end faces of the fibers in two connectors in an end-to-end configuration. In most cases, the intent is to establish physical contact between coupled fibers to prevent loss of light. Physical contact avoids a trapped layer of air between two fibers, which would increase connector insertion loss and reflection loss. An adaptor, not shown, is required to securely couple the ferrules of two connectors (the ferrule housing 104 of each connector is plugged into the adaptor).

The optical fiber connector illustrated in FIG. 8 manufactured by US Conec Ltd. is purportedly in accordance with the structure disclosed in U.S. Pat. No. 5,214,730, which is assigned to Nippon Telegraph and Telephone Corporation. As illustrated in the '730 patent, the optical fiber connector receives a optical fiber ribbon cable having a plurality of individual optical fibers and maintains the individual optical fibers in a predetermined relationship. The optical fiber connector can be mated with another optical fiber connector (e.g., using an adaptor) so as to align the plurality of individual optical fibers of one optical fiber connector with the plurality of optical fibers of the other optical fiber connector.

The ferrule 102 from US Conec Ltd. is generally in the form of a plastic block having a series of over-sized through-holes that provide sufficient clearance for inserting the terminating ends of optical fibers 112 and alignment pins 108 into the block. The ferrule 102 is formed by molding of a plastic polymer that is often reinforced by glass particles. To insert the terminating ends of the multiple optical fibers 112 through the holes in the ferrule block 102, the protective jacket and buffer (resin) layers of the optic fiber are stripped off to expose the cladding layer near the terminating ends, and the cladding layer is coated with a layer of epoxy. The terminating ends of the optical fibers are then threaded into the over-sized holes in the ferrule. The ends of the optical fibers 112 are securely held in the ferrule 102 upon curing of the epoxy. Similarly, the ends of the alignment pins 108 are coated with epoxy before inserting into the oversized holes in the ferrule 102 provided for the pins.

The above described ferrule has several significant drawbacks. The injection molded structure inherently does not hold tolerance well. The polymer is not rigid and deforms when loads (forces or moments) are applied to the fiber cable or connector housing. Polymers are also susceptible to creep and thermal expansion/contraction over longer periods of time. The clearance in the over-sized holes in the ferrule further affects tolerance of end-to-end alignment of fibers. The epoxy shrinks upon curing, which leads to bending of the plastic ferrule. Further, epoxy creeps over time, leading to pistoning or retracting of the optical fiber ends (which are pushed against the ends of adjoining fibers) within the holes in the ferrule under the applied axial bias of the spring-load in the connector. This compromises the integrity of the surface contact interface of opposing fiber end faces. These and other deficiencies result in poor resultant tolerance that is more to be desired for modern day optical fiber applications.

Currently, it is generally accepted that current fiber connectors cost too much to manufacture and the reliability and loss characteristics are more to be desired. The tolerance of the fiber connectors must improve and the cost of producing fiber connectors must decrease if fiber optics is to be the communication media of choice for short haul and very short reach applications. The relatively widespread and ever increasing utilization of optical fibers in communication systems, data processing and other signal transmission systems has created a demand for satisfactory and efficient means of inter-joining fiber terminals.

It is therefore desirable to develop a new optical fiber connector design, and in particular a new ferrule design, which results in low insertion loss and low return loss, which provides ease of use and high reliability with low environmental sensitivity, and which can be fabricated at low cost.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

SUMMARY OF THE INVENTION

Figure 1:
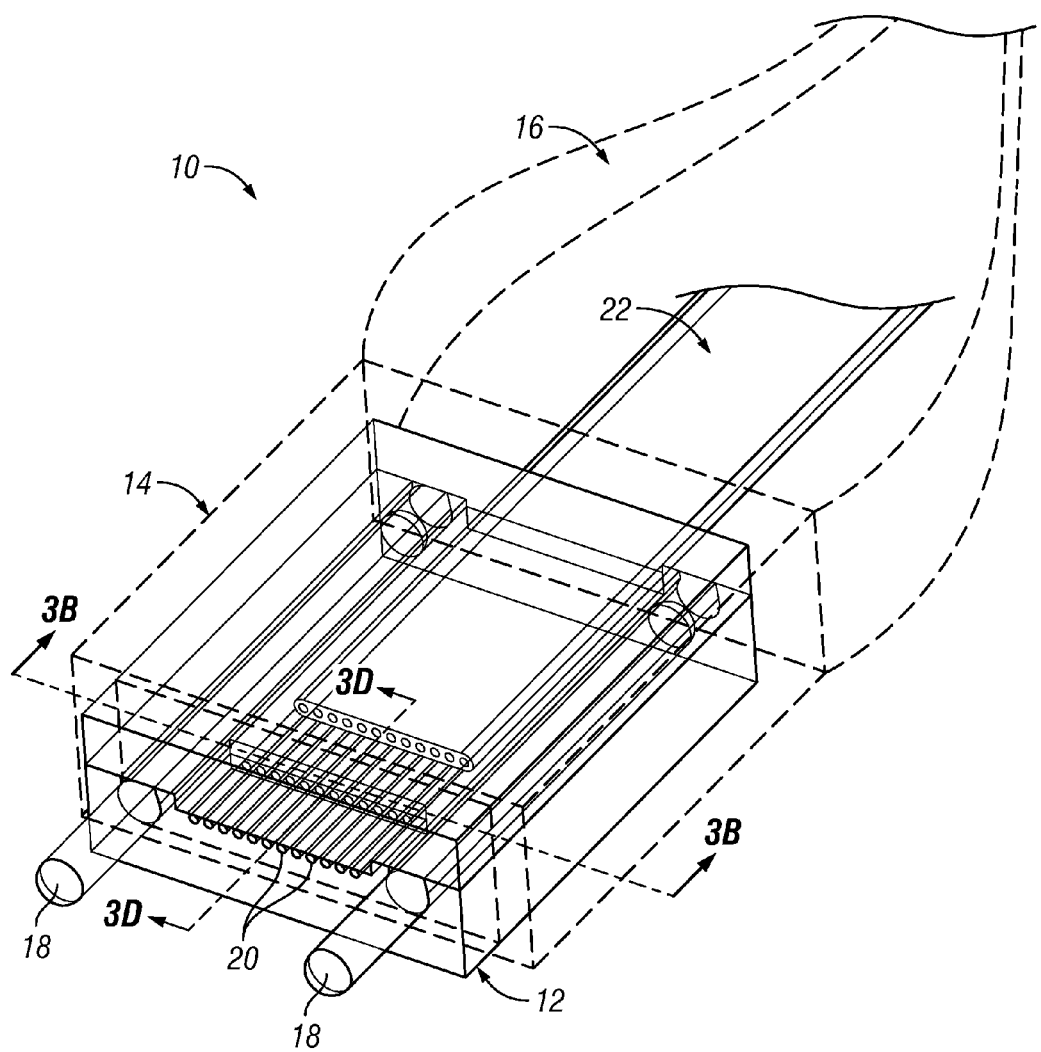
FIG. 1 illustrates a perspective view of an assembly including a ferrule for use within an optical fiber connector in accordance with one embodiment of the present invention.

The present invention provides a ferrule for an optical fiber connector, which overcomes many of the drawbacks of the prior art ferrules and connectors. The ferrule in accordance with the present invention provides an optical fiber connector having an optical fiber ferrule, which results in low insertion loss and low return loss, which provides ease of use and high reliability with low environmental sensitivity, and which can be fabricated at low cost.

In one aspect of the present invention, the ferrule has an open structure that has precision features formed thereon, namely open fiber clamping grooves, which can securely clamp the optical fibers without the need for epoxy or a complementary precision part. In one embodiment, the ferrule has a body having a plurality of open grooves formed in parallel on one surface thereof for receiving and clamping the terminating end sections of optical fibers. In a further aspect of the present invention, at least a section of the longitudinal opening of the groove is provided with opposing lips to provide a clamping effect. The width of the longitudinal opening defined between the lips along at least a section of the grooves is narrower than the diameter of the optical fibers to create a tight fit (e.g., an interference fit) with respect to the fibers, which allows the end section of an optical fiber to be inserted laterally into the longitudinal opening of groove, but which snuggly retains the optical fiber in the groove. The grooves and the width of the longitudinal groove openings are shaped and sized to retain the fibers without any clearance to allow for movement of the fiber relative to the groove. The grooves may have a rounded bottom to conform to the external shape of the optical fiber, or a flat bottom or a v-groove (thus resulting in spaces between the fiber and the wall of the groove). The rounded bottom is preferable since it increases the contact area with the fiber and provides more uniform elastic stress within the fiber.

In one embodiment, the width of the longitudinal opening of the groove is uniform along the entire length of the groove. In another embodiment, only certain section or sections of the groove opening is narrowed by the lips (e.g., at the end of the grooves near the end face of the optical fiber, and/or at the other end of the grooves).

In a further embodiment, similar grooves may be provided in the ferrule body for alignment guide pins.

In another aspect of the present invention, the grooves are precision formed by high throughput processes, such as stamping and extrusion. In one embodiment, the grooves are initially formed by precision stamping, followed by narrowing of the openings of the grooves, for example, by stamping or punching the top surface of the ferrule body to push the material at the two opposing edges of the opening into the opening in the groove to form a lip, or laser machining to melt the material at the corners of the opening to flow into the opening of the groove to form a lip.

In another embodiment, the grooves with narrowed opening are formed by extrusion of a blank through a die.

In one embodiment, the ferrule body is made of a metal material, which may be chosen to have high stiffness (e.g., stainless steel), chemical inertness (e.g., titanium), high temperature stability (nickel alloy), low thermal expansion (e.g., Invar), or to match thermal expansion to other materials (e.g., Kovar for matching glass).

The ferrule in accordance with the present invention overcomes many of the deficiencies of the prior art, resulting in an optical fiber connector that results in low insertion loss and low return loss, which provides ease of use and high reliability with low environmental sensitivity, and which can be fabricated at low cost.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention provides a ferrule for an optical fiber connector, which overcomes many of the drawbacks of the prior art ferrules and connectors. The ferrule in accordance with the present invention provides an optical fiber connector having a optical fiber ferrule, which results in low insertion loss and low return loss, which provides ease of use and high reliability with low environmental sensitivity, and which can be fabricated at low cost.

FIG. 1 illustrates a perspective view of an optical fiber assembly 10 having an assembly of components including a ferrule 12 in accordance with one embodiment of the present invention. The connector 10 further includes a ferrule housing 14 (shown in dotted lines), a cable boot 16 (shown in dotted lines), and alignment guide pins 18. The ferrule 12 is structured for multiple optical fibers 20 (e.g., 12 fibers held within a sleeve 27 to form an optical fiber ribbon cable 22). The recess 28 is sized to receive the sleeve 27 entirely with the recess 28. FIG. 1 is a simplified illustration of the optical fiber connector 10. Other than the ferrule 12 that is structured in accordance with the present invention, the other components of the optical fiber assembly 10 may further include those found in the optical fiber assembly shown in FIG. 8 (i.e., the ferrule in accordance with the present invention may be made backward compatible to be used in MTO/MPO optical fiber connectors as offered by US Conec Ltd.).

Figure 2:
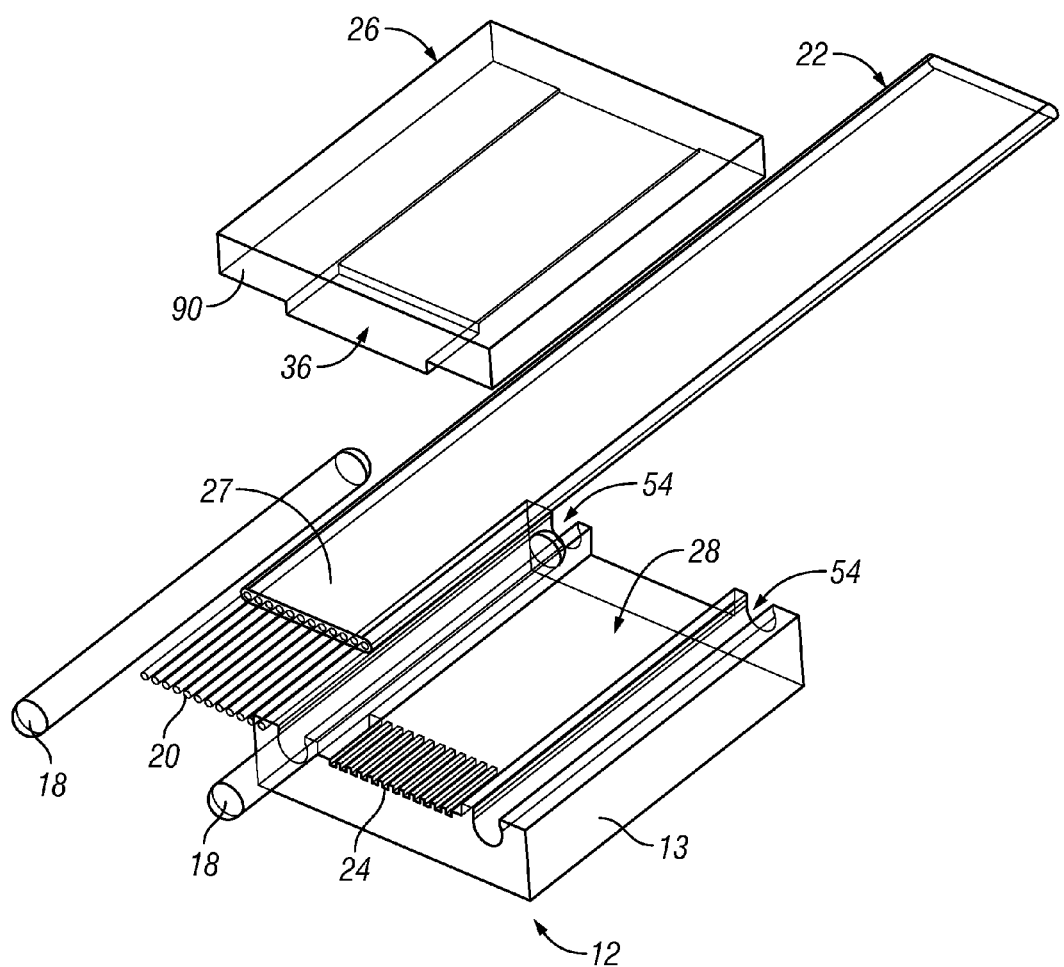
FIG. 2 is an exploded view of the ferrule and optical fiber assembly in accordance with one embodiment of the present invention.

In one aspect of the present invention, the ferrule has an open structure that has precision features formed thereon, which can securely hold optical fibers without the need for epoxy or a complementary precision part. FIG. 2 is an exploded view of the ferrule 12 and optical fiber assembly in accordance with one embodiment of the present invention. Referring also to FIGS. 3A to 3D, the ferrule 12 has a body 13 having a plurality of longitudinal open grooves 24 formed in parallel on the surface within a recess 28 in the ferrule body 13. As more clearly seen in FIG. 3D, the grooves 24 are formed on a raised platform 29 in the recess 28. The grooves 24 receive the terminating end sections of the optical fibers 20 (bare sections with cladding exposed, without protective buffer and jacket layers). The sleeve 27 of the fiber ribbon 22 is fitted within the floor section 30 in the recess 28, which provides additional room to accommodate the thickness of the sleeve 27 and the protective buffer and jacket layers on the fibers 20 within the sleeve.

Figure 8:
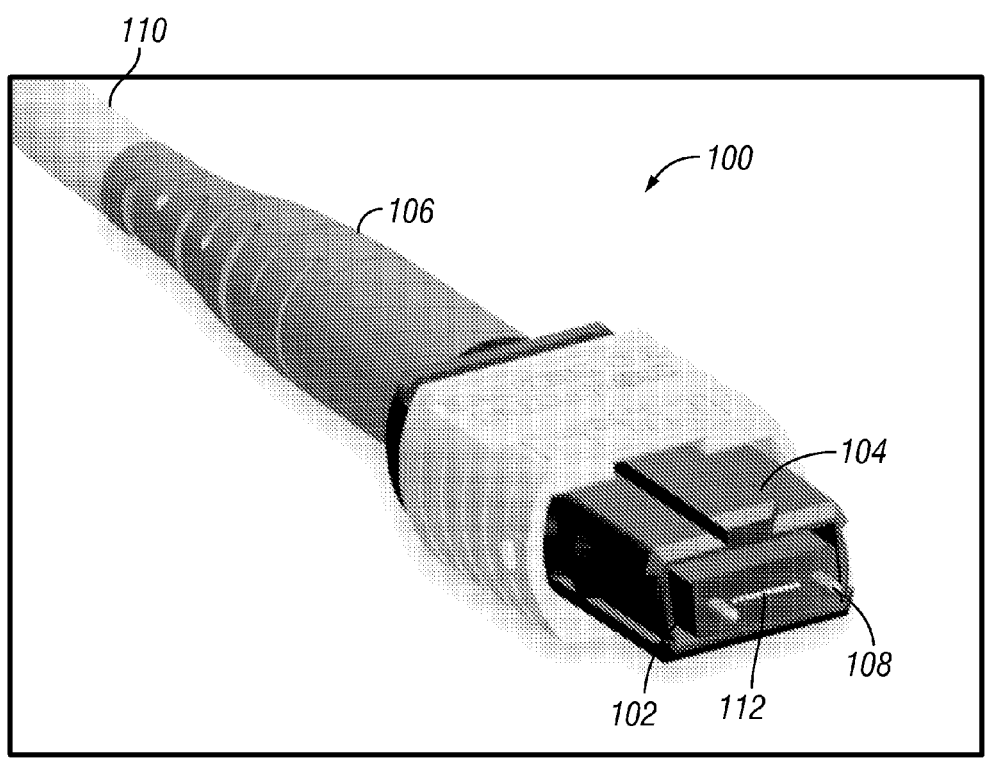
FIG. 8 illustrates a prior art optical fiber connector.

The grooves 24 are structured to securely retain the fibers 20 (bare sections with cladding exposed, without protective buffer and jacket layers) by clamping the fibers 20, e.g., by an interference fit (or press fit). As referenced throughout herein, in the context of the present invention, and consistent with the customary usage in the mechanical field, the term "interference" refers to the dimensional relationship between mating parts, which is beyond the dimensional tolerances of individual parts. Tolerance is an intended limit to dimensional variations or deviations from a nominal dimension in connection with the fabrication of a part by a controlled process. The actual dimension would be within the tolerance range about the nominal dimension. In contrast, interference is achieved by intentionally sizing and shaping at least one of two mating parts with intended nominal dimensions to provide the desired interference fit between the two mating parts. There would be fabrication tolerances for the nominal dimensions that are intended to achieve the intended interference. In other words, even if there is zero tolerance in the fabrication process, the actual dimensions would then be the nominal dimensions of the mating parts, which would still result in the interference as intended. The interference fit assures that the fibers 20 are clamped in place and consequently the position and orientation of the fibers is set by the location and parallelism of the grooves 24. The use of an interference fit contrasts with that of the molded ferrule as shown in FIG. 8 which has a hole that is tolerance to be larger than the diameter of the optical fiber. Consequently, the oversized hole does not govern the position of the optical fiber.

Figure 3A:
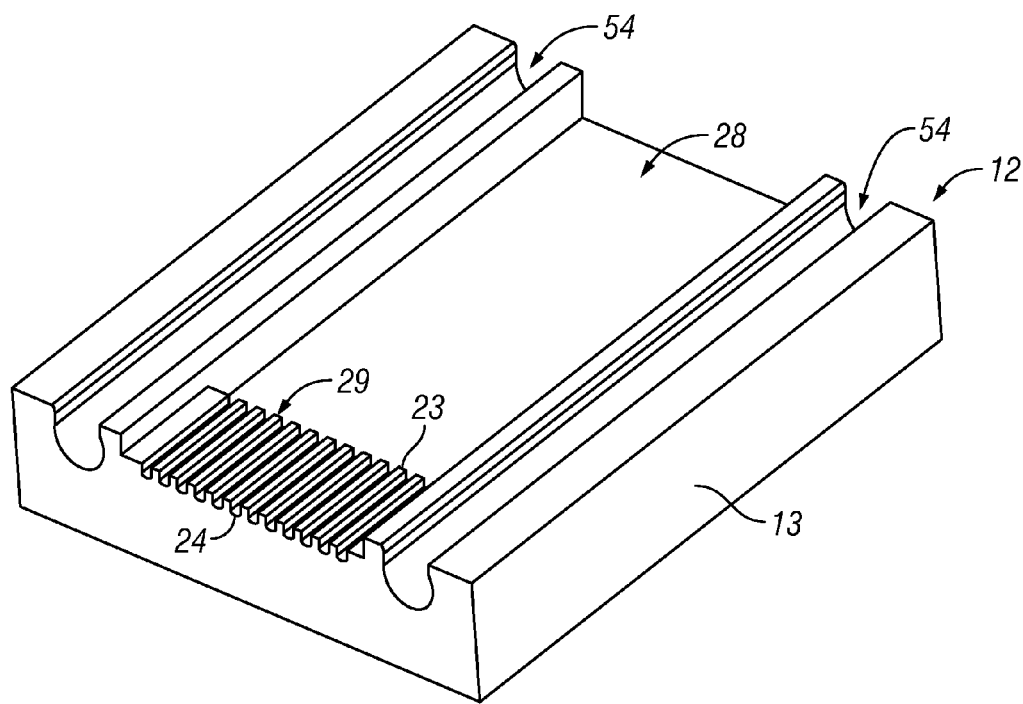
FIG. 3A is a perspective view of the ferrule in accordance with one embodiment of the present invention.
Figure 3B:
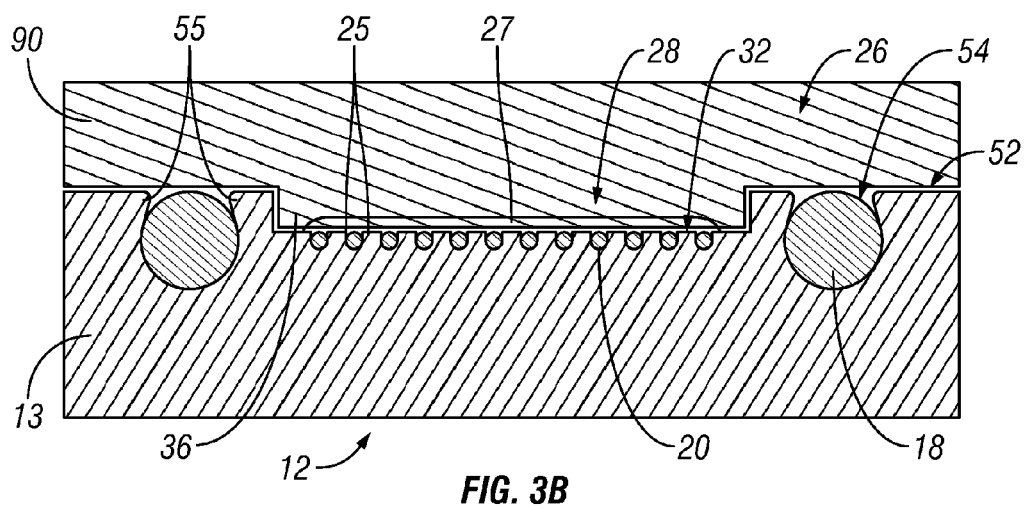
FIG. 3B is a sectional view of the ferrule taken along line 3B-3B in FIG. 1, with fibers and guide pins.
Figure 3C:
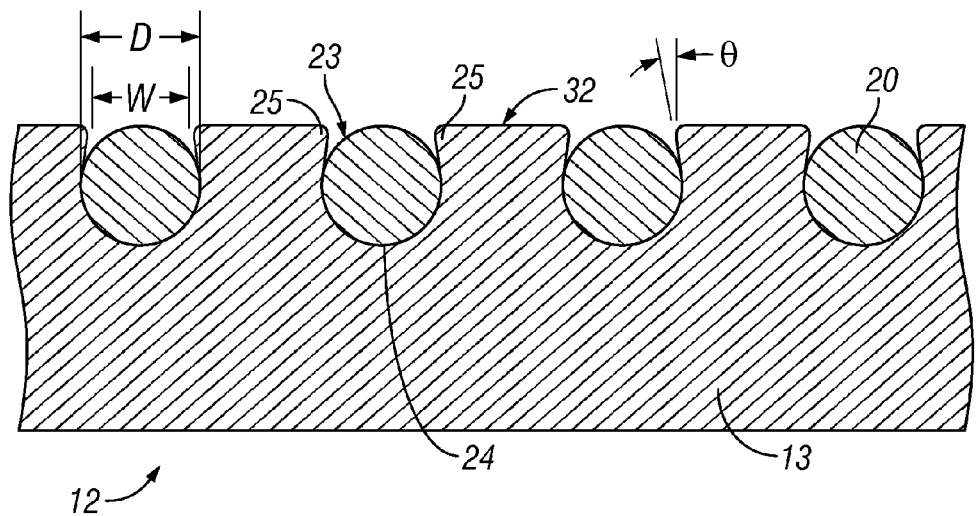
FIG. 3C is an enlarged sectional view of the grooves and fiber.
Figure 3D:
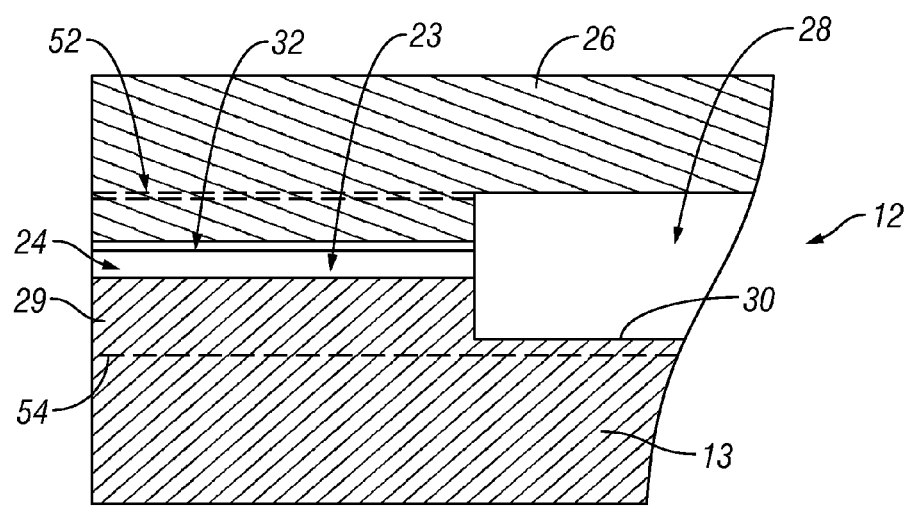
FIG. 3D is a sectional view of the ferrule taken along line 3D-3D in FIG. 1.
Figure 3E:
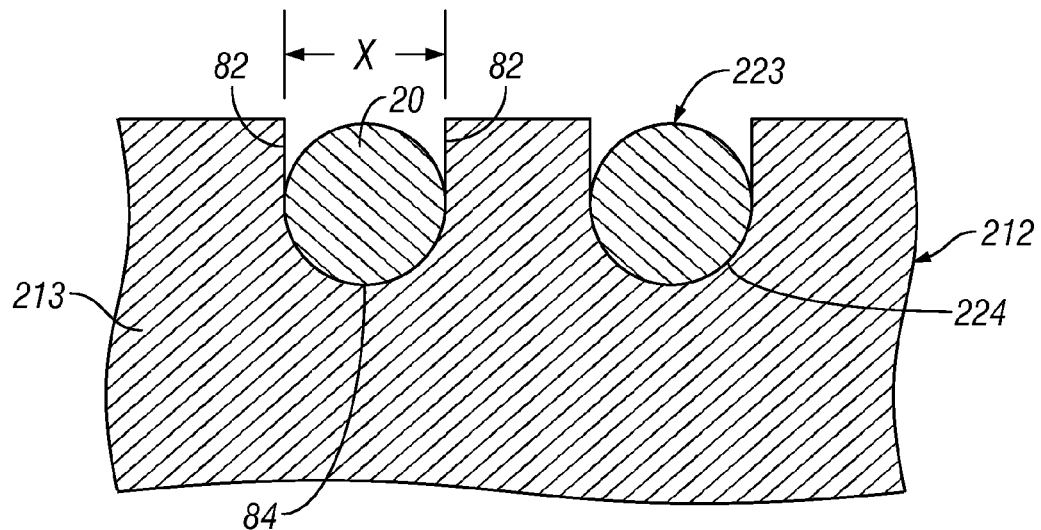
FIG. 3E is sectional view of an alternate embodiment of the grooves in the ferrule.

In one embodiment as illustrated in FIG. 3E, the grooves 224 in the body 213 of the ferrule 212 may be generally U-shaped channels each having approximately parallel walls 82 extending from a semicircular bottom 84. The distance X between the parallel walls 82 (or the width X of the longitudinal opening 223) is sized to be slightly less than the diameter of the optical fiber 20 (bare fiber with cladding exposed, without protective buffer and jacket layers) to provide interference fit. (As referenced throughout herein, the diameter of the optical fibers refers to the diameter of the bare fiber with cladding exposed without protective buffer and jacket layers, e.g., 125 µm.) This interference fit alone can be sufficient to securely clamp the ends of the fibers 20 within the grooves 224.

In a further aspect of the present invention, to facilitate clamping of the fibers 20 by the grooves 24, the width W of the longitudinal opening 23 of the grooves 24 is made slightly narrower than the diameter of the optical fibers 20. In particular, the opening 23 is defined by lips 25 formed at the opposing longitudinal edges of the longitudinal opening 23. The width W of the longitudinal openings 23 is slightly undersized to allow the terminating end section of the optical fibers to be inserted laterally into the longitudinal openings 23 of the grooves with an interference fit. The magnitude of interference can be set by the manufacturing process so that loading the fiber into the groove causes only elastic deformation or minor plastic deformation in the lip. The grooves should not be plastically deformed, otherwise it will affect the accuracy of the fiber locations.

Specifically, to attach the fibers 20 to the ferrule 12, the terminating end section of the fibers 20 are pressed lengthwise into the grooves 24 through the longitudinal openings 23 with a snap action (i.e., not in the axial direction of the grooves), with the tip of the fibers 20 slightly protruding beyond the end face of the ferrule body 13. Further, the width W of the longitudinal openings 23 and the grooves 24 are sized and shaped to snuggly retain the section of optical fibers 20 in the grooves 24 without providing any clearance for axial and lateral movements of the end face of the fibers relative to the grooves to ensure tight tolerance for optical coupling between end faces of two adjoining fibers. No epoxy would be required for retaining the bare fiber sections in the grooves given the interference along the mating surfaces between the fibers 20 and the grooves 24.

There are alternate ways to create the interference. One way is to have the lips 25 press downward onto the top surface of the fiber so that the fiber is pressed into the semi-circular portion of the groove 24. Another way is to have the sidewalls of the groove clamp the fiber from the sides. In the first approach, the elastic deformation of the lip provides the clamping force. In the second approach, the interference from the vertical walls elastically deforms and clamps the fiber sides. Both approaches may be implemented together by appropriately shaping and sizing the grooves and lips. It is noted that the contact pressure resulting from the interference between the groove and fiber should not exceed the strength of the fiber. It should only be great enough to retain the fiber and generate friction that opposes axial sliding of the fibers within the grooves motion. Only a few micrometers of interference is necessary. In general, the interference is less than a few micrometers, more typically one or two micrometers.

As an example and not limitation, in one embodiment, for optical fibers 20 made of silica and having a diameter of 125 µm, in a ferrule made of kovar (54% Fe, 29% Ni, 17% Co) material, the length of the grooves 24 may be 1 to 3 mm, the diameter or width (i.e., the maximum lateral dimension D) of the grooves 24 is 0.124 mm, and the width W of the longitudinal openings 23 is 105 µm. The interference provided is about 1 µm, appropriate for the silica and kovar material. The silica glass is very high strength in compression, so it will withstand high contact pressures from the interference fit.

Referring to the embodiment illustrated in FIG. 3C, for circular cylindrical optical fibers 20, the grooves 24 are cylindrical having a generally circular cross-section (except at the opening 23) conforming to the cylindrical surface of the fibers 20. A longitudinal section at the top of each fiber 20 is exposed by the respective longitudinal opening 23. This exposed section of the fibers 20 may protrude slightly above the plane 32 of the openings 23, or preferably coplanar or slightly below the plane 32 of the openings 23. In particular, the grooves 24 may be perceived to be a cylindrical space having a generally circular cross-section defined by a cylindrical wall terminating with longitudinal lips 25 that define the longitudinal opening 23. Alternatively, the grooves 24 may be perceived to be a cylindrical space having a generally U-shaped cross-section defined by a rounded (e.g., semicircular) bottom and a cylindrical wall terminating with inwardly directed longitudinal lips 25 that define the longitudinal opening 23, which conform to the external shape of the fibers 20. In either case, near the lips 25, the sidewalls of the groove 24 tilt inward towards the opening 23 at an angle θ of about 5 to 20 degrees with respect to the vertical tangent to the fiber 20.

The embodiment shown in FIG. 3C illustrates the cross-sectional shape of the grooves 24 generally conforming to the body of the fibers 20. The fiber 20 is securely "clamped" within the groove 24, with the lips 25 pressing on the top of the fiber 20 against the bottom and other parts of the groove 24. In the illustrated embodiment, the wall of the fiber 20 is shown to press against the entire wall of the groove 24, except near the opening 23. This provides a substantially uniform pressure on substantially the entire circumference of the fiber, which has less effect on the optical signals transmitted through the fiber 20 due to stress-induced changes in fiber or core indices of refraction. However, it is well within the scope and spirit of the present invention to structure the grooves in the ferrule with different cross-sections that would still provide adequate interference fit to securely retain the fibers 20 in the grooves. For example, the grooves may have a flat or curved bottom, curved sidewalls, or flat sidewalls perpendicular or at a slight divergent angle to the flat bottom (e.g., a v-bottom), and inwardly directing lips to define the longitudinal opening of the groove. These groove configurations would result in certain spaces between the curved fiber walls and the flat or curved sidewalls of the groove, but the clamping action by the lips 25 and/or vertical walls of the grooves against the fiber nonetheless would not provide any clearance to allow for movement of the fibers within the groove.

Given that the fiber 20 is completely retained in the groove 24, and the profile of the groove such as lips 25 and the bottom of the groove dictate the location of the fiber 20 within the groove, the fiber 20 is positioned with precision in the ferrule by the groove. Accordingly, the relative locations (e.g., spacing) of the fibers 20 in the ferrule 12 are precisely maintained within the ferrule, e.g., for alignment to fibers in opposing optical fiber connector.

In the embodiment illustrated in FIG. 3C, the width W of the longitudinal opening 23 is uniform along the entire length of the grooves 24. In another embodiment (not shown), the narrower width W is present at certain section or sections along the groove opening, with the rest of the groove opening at width D. For example, the width of a section (e.g. 0.5 to 2.0 mm length section) along the longitudinal groove opening near the end face of the ferrule body 13 may be narrower than the width of the remaining sections of the longitudinal opening. Thus, only a small section near the end face of the optical fiber 20 is securely clamped in the groove by interference fit, while allowing for some movements of the remaining section of fibers 20 within the groove, so as to allow for strain relief of the fibers to reduce lateral pressure on the fibers. In this embodiment, for the section of fiber within the wider section of the groove without the narrowed opening width W, part of the buffer layer and/or jacket layer may be left on the fiber, to provide a cushion for the fibers in the wider groove section. The ferrule according to this embodiment only applies clamping pressure near the end face of the fibers where optical alignment is critical, and where the clamping pressure may have less effect on optical aberration that causes signal degradation due to stress-induced changes in the optical fiber. In a further embodiment, other sections along the groove opening may be provided with the narrower width W. For example, at the other end of the groove, the width of the groove opening may be at the narrower width W. Tightening groove at the two ends of the groove provides a means to withstand small moments that could be applied through the ribbon cable.

Figure 3F:
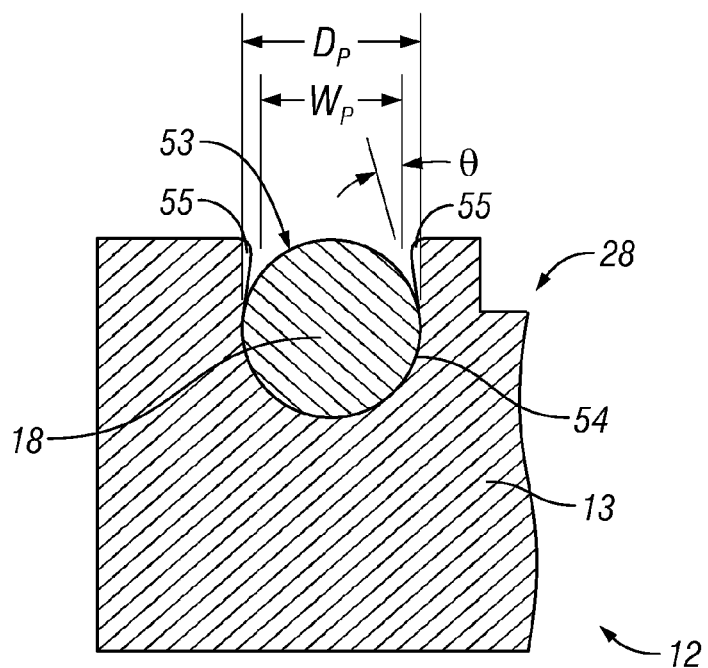
FIG. 3F is an enlarged sectional view of the groove and alignment pin.

Referring also to FIG. 3F, to facilitate alignment of adjoining optical fiber connectors, longitudinal open grooves 54 may be provided in the ferrule body 13 for alignment pins 18. The grooves 54 have similar structures for the fiber grooves 24 discussed above. Specifically, the grooves 54 are provided with longitudinal openings 53. The grooves 54 can be similarly shaped and sized to securely clamp the alignment pins 18, e.g., by interference fit. Longitudinal lips 55 may be provided at the opposing longitudinal edges of the grooves 54, similar to the lips 25 for the fiber grooves 24. Similar considerations discussed above may be applied to the grooves 54 for the alignment pins 18, except for concerns directed to signal degradation since the pins are not an optical part. Nevertheless, concerning location of lips 55 along the longitudinal openings 54, lips 55 may be provided along the opening 53 at a section near the end face of the ferrule body at which the fiber terminates, further at the other end of the groove 54, or further at both ends of the groove. The cross-sectional profile of the pin grooves 54 may be different from that of the fiber grooves 24 on the same ferrule.

As an example and not limitation, in one embodiment, for alignment pins 18 made of stainless steel and having a diameter of 0.7 mm, in a ferrule made of kovar material, the length of the grooves 54 may be 5 to 15 mm, the diameter or width (i.e., the maximum lateral dimension $D_P$) of the grooves 54 is 0.698 mm, and the width $W_P$ of the longitudinal openings 53 is 0.560 mm. The interference provided is about 2 μm, appropriate for the kovar and stainless steel material.

For the ferrule in accordance with the present invention, no retaining plate or complementary ferrule would be required to securely and precisely position the fibers 20 and alignment pins 18 within the optical fiber connector. Referring to FIGS. 2, 3B and 3D, a dust cover 26 may be provided, which does not serve any fiber alignment function or effective support to position the fibers 20 and the alignment pins 18. In other words, the cover 26 is not and does not play the role of a ferrule for holding an optical fiber to be precisely aligned to another optical fiber. The cover 26 may be a low precision part, which may be loosely fitted in the recess 28 in the ferrule body 13 to prevent bending of the fibers out of the floor plane 30 of the recess 28. The cover 26 may, however, provide clamping of the fiber ribbon 22 against the recess 28 of the ferrule body 13. The cover 26 may have a protruded portion 36 at the center, which fits into the recess 28. Either the protruded portion 36 rests on the surface plane 32 of the openings 24, or the thinner perimeter sections 90 of the cover 26 rests on the surface plane 52 of the openings 54, or both may rest on the respective surface planes 32 and 52. In another embodiment (not shown), the protruded portion 36 may be omitted, which renders the cover 26 in the form of a plate having a uniform thickness.

In another aspect of the present invention, the fiber grooves and alignment pin grooves 54 are precision formed by high throughput processes, such as stamping and extrusion. FIG. 4 schematically illustrates sectional views that schematically illustrate the steps of forming the grooves features of the ferrule 12 discussed above by precision stamping, in accordance with one embodiment of the present invention. The same stamping procedure applies to fiber grooves 24 and alignment pin grooves 54. FIG. 4 is simplified to illustrate the region of one groove, which may be a fiber groove or an alignment pin groove. In practice, all the fiber grooves (e.g., 12 of them) and the two alignment pin grooves are formed concurrently. Accordingly, while not specifically shown in FIG. 4, there will be as many features of appropriate sizes for the various punches corresponding to the multiple fiber grooves 24 and pin grooves 54 to be formed on the same blank. (See FIG. 4F.)

Figure 4A:
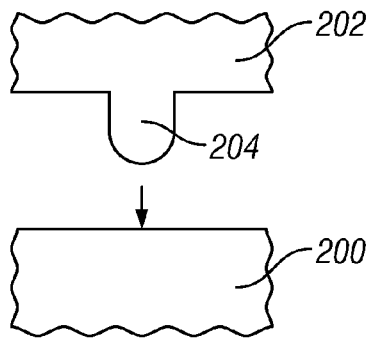
FIG. 4 schematically illustrates the process of forming the features of the ferrule by stamping in accordance with one embodiment of the present invention.
Figure 4B:
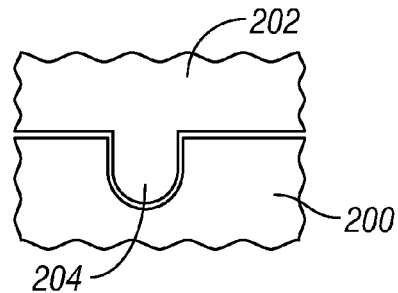
Figure 4C:
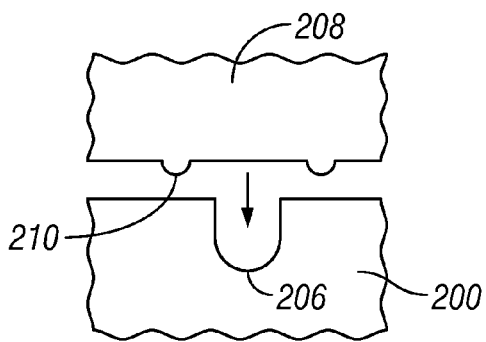
Figure 4D:
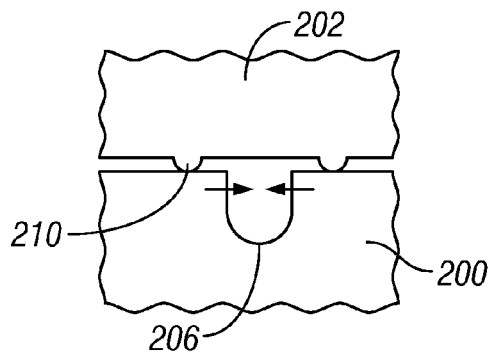
Figure 4E:
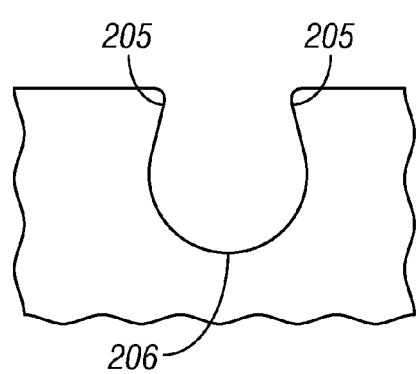
Figure 4F:
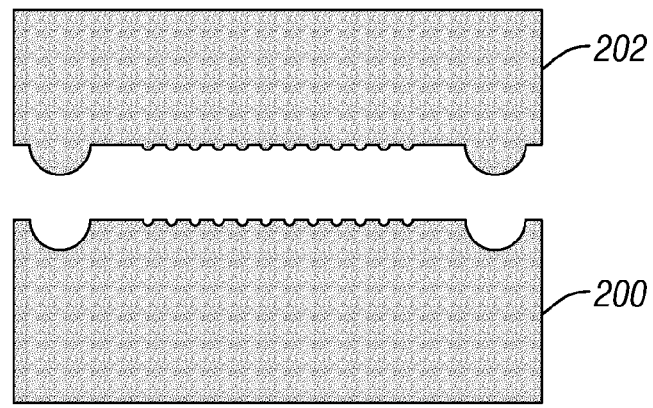

At step A, a metal blank 200 (which may be preformed with the external general shape of the ferrule body 13 but without the grooves) is positioned below a punch 202 having a protruding longitudinal U-shaped feature 204). At step B, upon stamping, a longitudinal U-shaped groove 206 is formed in the blank 200 by the U-shaped feature 204. The depth of the U-shaped groove 206 is chosen so that the final groove is deep enough to retain the fiber/pin, with the top of the fiber/pin protruding slight above, coplanar with or slight below the adjacent top surface adjacent the opening of the groove. For example, the U-shaped groove has a width of about 125 µm (to allow for desired interference) if for a fiber groove 24, or about 700 µm (to allow for desired interference) if for an alignment pin groove 54. At step C, the blank 200 with the U-shaped groove 206 is positioned below another punch 208 having two parallel longitudinal protruded features 210 that are spaced apart at a distance wider than the opening of the U-shaped groove 206 (e.g., the centerline of the protruded feature 210 is about 40 µm from the edge of the U-shaped groove 206). At step D, upon stamping, the protruded features 210 press on the top surface of the blank 200 and push the material of the blank to form longitudinal lips 205, thus narrowing the opening of the groove 206. At step E, after removal of the punch 208, the final groove 206 would have the desired shape, dimension and interference, such as that of the fiber groove 24 or alignment pin grooves 54 discussed above. FIG. 4F is a schematic illustration of an exemplary complete punch 202 and blank 200 that underwent step B above in the process of forming an entire ferrule by stamping.

It can be appreciated from the foregoing that open channels or grooves can be more easily and precisely formed, compared to forming through-holes in a plastic ferrule block practiced in the prior art.

Other commonly known details of the above stamping process have been omitted, such as sizing and shaping of the punches 202 and 208 to provide the stamped product having the desired size and shape. For example, the punch 202 may be appropriately shaped so the edges of the longitudinal opening in the groove 206 are slightly rounded to facilitate insertion of a fiber/pin. Further, each step illustrated in FIG. 4 may comprise two or more sub-steps to achieve the result of that step. For example, the formation of the groove 206 in step B may involve a pre-punch step followed by punching with the final punch 202. Further other intermediate steps may have been omitted from the discussion above.

A precision stamping process and apparatus has been disclosed in U.S. Pat. No. 7,343,770, which was commonly assigned to the assignee of the present invention. This patent is fully incorporated by reference herein. The process and stamping apparatus disclosed therein may be adapted to precision stamping the ferrules of the present invention.

Figure 5A:
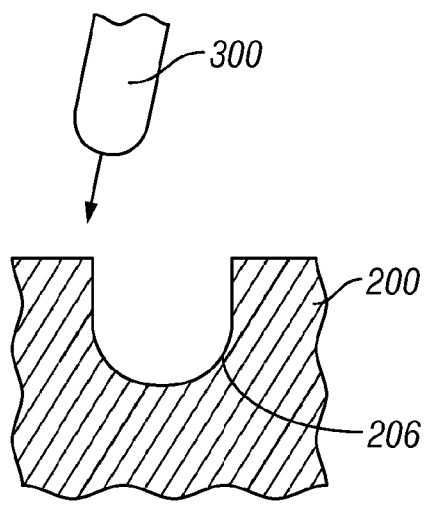
FIG. 5 schematically illustrates an alternate process of narrowing the opening of the grooves by laser machining, in accordance with another embodiment of the present invention.
Figure 5B:
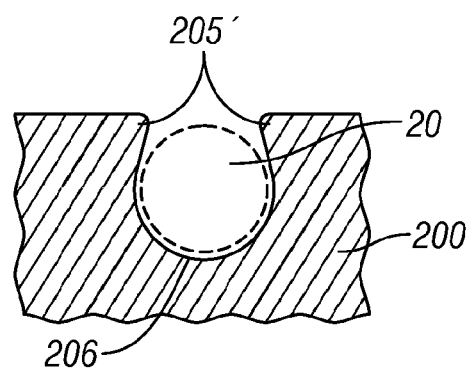

FIG. 5 schematically illustrates an alternate process of narrowing the opening of the grooves formed after step B in FIG. 4. In this embodiment, similar to laser welding, at step A, a laser beam 300 is applied to spot-melt the material of the blank at the longitudinal edges of the longitudinal opening of the groove 206 to form the longitudinal lip 205'. The molten material flows into the opening of the groove 206, thus narrowing the groove opening. At step B, after the molten material solidifies, the lips 205' are formed.

Figure 6:
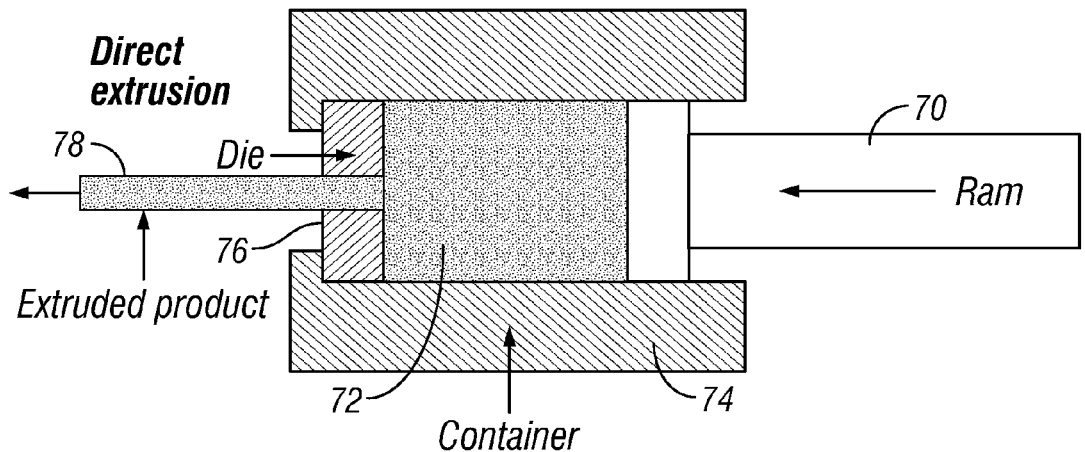
FIG. 6 schematically illustrates an alternate process of forming the features of the ferrule by extrusion in accordance with another embodiment of the present invention.
Figure 7:
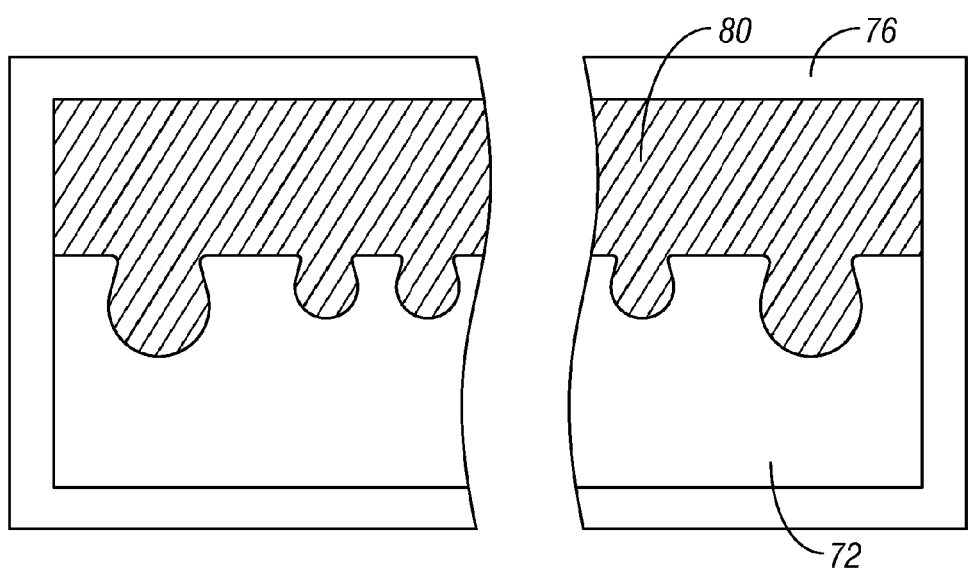
FIG. 7 illustrates the die used for extrusion of a blank to form the ferrule in accordance with an embodiment of the present invention.

FIG. 6 schematically illustrates an alternate process of forming the features of the ferrule by extrusion. In accordance with this embodiment, the external shape of the ferrule body 13 and the grooves 24 and 54 are formed in a single extrusion step. A ram 70 forces a billet or blank 72 (e.g., a metal blank) in a container 74 through a die 76 to produce the extruded product 78. By providing the appropriate die 76, the ferrule 12 having the groove features discussed above. FIG. 7 illustrates the sectional view of the die 76 used for extrusion of the billet or blank 72 to form the ferrule 12 in accordance with an embodiment of the present invention. The die 76 includes a punch 80 having features complementary to the grooves and other body features of the ferrule 12. The blank 72 is pushed through the die to obtain the ferrule 12.

In one embodiment, the ferrule body is made of a metal material, which may be chosen to have good thermal dimensional stability (e.g., Invar).

The ferrule in accordance with the present invention overcomes many of the deficiencies of the prior art. By not having any clearance between the grooves in the ferrule and the fibers and alignment pins which would otherwise lead to movements between the parts, the alignment pins and the fibers can be more accurately located relative to each other. The spacings of the fibers and pins can be better maintained under changes in environmental conditions, for example, as the ferrule can accommodate more dimensional variations without affecting specified alignment tolerances. The optical fiber connector thus formed results in low insertion loss and low return loss. The ferrule configuration also allows ease of attaching terminating fiber ends to the ferrules, compared to threading epoxy coated fibers through holes in prior art ferrules. Without using epoxy, the reliability of the optical fiber connector is not affected by any aging/creeping of epoxy material. By selecting appropriate materials for the ferrule, the performance of the optical fiber connector is less sensitive to thermal variations. The open structure of the ferrule lends itself to mass production processes such as stamping and extrusion, which are low cost, high throughput processes.

\* \* \*

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A method of producing a ferrule for supporting an optical fiber in an optical fiber connector, comprising:
  forming from a blank a body having a plurality of longitudinal open grooves provided on a surface of the body, wherein each groove is sized to securely retain an optical fiber in the groove by clamping the optical fiber, and wherein the forming step comprises stamping the blank to form a plurality of generally U-shaped channels each having a longitudinal opening.

2. A method as in claim 1, wherein the forming step further comprises narrowing at least a section of the longitudinal opening of the U-shaped channels.

3. A method as in claim 2, wherein the narrowing step comprises stamping the material adjacent to the opening of the U-shaped channels to push the material inward into the opening to narrow the section of the opening.

4. A method as in claim 2, wherein the narrowing step comprises spot-melting opposing edges of the section of the opening to flow material inward into the opening to narrow the section of the opening.

5. A method as in claim 1, wherein the groove is sized and shaped to securely retain the optical fiber in the groove to prevent movement of the fiber with respect to the groove.

6. A method as in claim 5, wherein the groove securely retains the optical fiber in the groove without clearance between the optical fiber to allow for movement of the fiber with respect to the groove.

7. A method as in claim 6, wherein the groove securely retains the optical fiber in the groove without requiring epoxy or another body.

8. A method as in claim 1, wherein the longitudinal opening has a width defined by two opposing lips formed at opposing edges along at least a section of the opening, and wherein the width is less than a diameter of the optical fiber, whereby the optical fiber is securely retained in the groove by an interference fit.

9. A method as in claim 1 wherein the longitudinal opening has a width defined by two opposing lips formed at opposing edges along at least a section of the opening, and wherein the width is less than maximum width of the groove within a same cross-section that includes the lip.

10. A method as in claim 1, wherein the groove has a semi-circular bottom in cross-section.

11. A method as in claim 8, wherein the width of the longitudinal opening is uniform along the entire length of the groove.

12. A method as in claim 11, wherein the lips extend longitudinally along the entire longitudinal opening.

13. A method as in claim 1, wherein the groove has a cross-sectional profile in which the groove has a bottom and opposing sidewalls extending from the bottom, wherein the sidewalls are tilted inwards from a vertical.

14. A method as in claim 13, wherein the opposing sidewalls terminate at opposing lips that define a width of the longitudinal opening of the groove, wherein the width is less than a maximum width of the groove within the same cross-sectional profile.

15. A method as in claim 1, further comprising a plurality of pin grooves on the surface of the body, wherein each pin groove has a longitudinal opening, and wherein each pin groove is sized and shaped to securely retain an alignment pin in the pin groove by clamping the alignment pin.

16. A ferrule produced by the method of claim 1.

17. An optical fiber connector, comprising:
a ferrule as claimed in claim 16; and
a housing supporting the ferrule.

18. A method of producing a ferrule for supporting an optical fiber in an optical fiber connector, comprising stamping a blank to form a body having a plurality of longitudinal open grooves provided on a surface of the body, wherein each groove is sized to securely retain an optical fiber in the groove by clamping the optical fiber.

19. A method as in claim 18, wherein the stamping step comprises stamping the blank to form a plurality of generally U-shaped channels each having a longitudinal opening.

20. A method as in claim 19, further comprising narrowing at least a section of the longitudinal opening of the U-shaped channels.

21. A method as in claim 20, wherein the narrowing step comprises stamping the material adjacent to the opening of the U-shaped channels to push the material inward into the opening to narrow the section of the opening.

22. A method as in claim 20, wherein the narrowing step comprises spot-melting opposing edges of the section of the opening to flow material inward into the opening to narrow the section of the opening.

* * * * *